United States Patent [19]

Nassir

[11] 4,257,788
[45] Mar. 24, 1981

[54] POWER RECOVERY HOT GAS SEPARATOR

[76] Inventor: Nicholas Nassir, 616 N. Hidalgo Ave., Alhambra, Calif. 91801

[21] Appl. No.: 108,808

[22] Filed: Dec. 31, 1979

Related U.S. Application Data

[63] Continuation-in-part of Ser. No. 30,025, Apr. 16, 1979, abandoned.

[51] Int. Cl.³ .................................................. B01D 45/12
[52] U.S. Cl. ........................................ 55/346; 55/435; 165/81
[58] Field of Search ................. 55/346, 348, 349, 435; 165/81

[56]  References Cited

U.S. PATENT DOCUMENTS

| | | | |
|---|---|---|---|
| 1,869,973 | 8/1932 | Lucke | 165/81 |
| 2,529,516 | 11/1950 | Scheibel | 165/81 |
| 2,862,571 | 12/1958 | Coward | 55/349 |
| 2,889,008 | 6/1959 | Copp et al. | 55/435 |
| 2,941,621 | 6/1960 | Dygert et al. | 55/344 |
| 2,986,273 | 5/1961 | Bardgett | 29/157 R |
| 2,986,278 | 5/1961 | Bjorklund | 209/144 |
| 3,066,854 | 12/1962 | Beins et al. | 55/1 |
| 3,131,043 | 4/1964 | Burdock | 55/346 |
| 3,225,525 | 12/1965 | Archer | 55/435 |
| 3,254,476 | 6/1966 | Kusek et al. | 55/267 |
| 3,279,532 | 10/1966 | Pfeil, Jr. | 165/81 |
| 3,415,042 | 12/1968 | Wilson | 55/348 |
| 3,541,766 | 11/1970 | Wilson | 55/348 |
| 3,584,439 | 6/1971 | Gronholz | 55/435 |
| 3,631,657 | 1/1972 | Wilson | 55/348 |

*Primary Examiner*—Tim R. Miles
*Attorney, Agent, or Firm*—Sellers and Brace

[57] ABSTRACT

A power recovery separator for processing huge volumes of high temperature pressurized dirty gas en route to a high temperature gas expander. The separator has a single housing sub-divided into overhead, inlet and underflow chambers by a pair of flanged and dished heads of erosion and heat resistant material having a higher coefficient of expansion than the housing material. A multiplicity of inertial separators are supported in parallel between the dished heads and secured to only one thereof. At least portions of the head flanges bear radially against the interior of the housing sidewalls and their rim edges are welded to the housing and, in consequence, expansion of the head serves, in part, to augment the bulge and, in part, to place the high strength housing wall in hoop tension without subjecting the welding to rupture stresses. All gas handling ducts are connected only to the housing wall thereby avoiding the need for any internal housing, any internal ducts, distribution screens or any expansion joints.

25 Claims, 6 Drawing Figures

POWER RECOVERY HOT GAS SEPARATOR

This application is a continuation-in-part of my copending application for U.S. Pat. Ser. No. 30,025, filed Apr. 16, 1979, entitled Fluid-Dynamic Separator, now abandoned.

This application relates to particulate-laden gas separator apparatus, and more particularly to a high temperature high pressure hot gas separator of simplified, highly efficient economical design having a single high strength housing sub-divided into three chambers by a pair of flanged and dished heads welded crosswise of the main housing by welds isolated from shear stresses.

BACKGROUND OF THE INVENTION

Certain industrial operations have need for processing huge volumes of high temperature pressurized particulate-laden gasses in a manner conserving the heat content thereof while en route to a power recovery gas expander. This need poses serious problems which continue to plague designers for this industry. Various separator designs have been proposed but all are subject to premature failure as well as frequent and costly maintenance and service operations involving very costly interruptions in operations required to be carried out on an uninterrupted continuous basis.

Typical U.S. Pat. Nos. showing these prior proposals include Coward 2,862,571; Dygert et al 2,941,621; Bjorklund 2,986,278; Beins et al 3,066,854; Wilson 3,415,042; Wilson 3,541,766 and Wilson 3,631,657. Most of these separators, as is true of this invention, are intended for use in the petroleum cracking art and in the coal and oil shale pyrolysis art, where the operating conditions are unusually severe owing to the high temperature and pressures and huge volumes of gas required to be processed with minimum heat loss, high efficiency and reliability and on a continuous uninterrupted basis. Typically, such separators operate at 30–40 psig and at 1,200° to 1,300° F. to supply clean gas to gas expanders currently having rated outputs of 30,000 horsepower and now being proposed with a rating of 50,000 horsepower. Not only is the medium being processed highly erosive but its pressure and temperature conditions are subject to wide-range and almost instantaneous process upset changes. These conditions arise when the normally oxygen-deficient gas reaches stoichiometric conditions due to a lowering of the carbon or an increase of the oxygen components within the gas. This upset is known in the industry as "after burn" and can cause gas temperature to rise as high as 2,500° and 2,600° F. with flame-front suddenness. This condition can prevail throughout the separator or, on occasion, may occur in some relatively isolated zone of the separator. The resulting sudden changes in temperature and pressure impose very severe stresses on the structure and cause severe warpage, expansion and rupture of welded joints, and failure of brittle materials such as the ceramic tubes confined by close clearance metal securements commonly used in previous designs.

Stainless steel satisfies substantially all requirements including the high temperature and erosion resistant factors, and could therefore be used for the entire structure including the outer housing. In this case the highly essential conservation of the process heat dictates use of a heat insulating jacket on the exterior of the housing. This poses serious assembly, securement and maintenance problems as respects the insulating jacket to leave unmentioned the prohibitively high cost. Owing to these considerations it has been the practice to employ a carbon steel housing protected by a thick internal insulating lining to conserve process heat and prevent the housing temperature rising above about 325° to 350° F. All other internal metal components unavoidably are normally subject to a temperature of 1,200° to 1,300° F. but some or all may, at times, be subject to 2,500° to 2,600° F. during "afterburn" operating conditions.

The serious stress conditions to which a composite carbon steel-stainless steel structure is subjected by the above mentioned temperature and pressure conditions is evident from the fact that the commonly used 304 type stainless steel expands 12.25 inches per hundred feet at 1,000° F., whereas a similar length of carbon steel expands only 8.8 inches under these conditions. However, under a typical prevailing internal operating temperature of 1,200° F. and a corresponding housing temperature of 350° F., the stainless steel expands 14.7 inches per hundred feet whereas the carbon steel housing expands only 2.3 inches per hundred feet to provide an expansion ratio of 6.4 to 1. The serious aspects of this very high differential expansion become all the more evident when it is realized that this differential expansion ratio can approach 7.5 to 1 during suddenly occurring "afterburn" conditions when the internal temperature of the stainless steel components can reach 1,600° F. without a substantial increase in the temperature of the carbon steel housing.

Various techniques have been proposed for minimizing the stresses in welded joints which are the locale of most structural failures due to process upsets. These include the use of non-flanged dish shaped partitions as exemplified in the aforesaid Wilson patents, concentric inner and outer chambers, expansion joints both interiorly and exteriorly of the main separator housing, various arrangements of internal ducting and manifold structures, and other expedients, all of which are subject to serious shortcomings avoided by this invention.

SUMMARY OF THE INVENTION

This invention avoids the foregoing and other shortcomings and disadvantages of prior constructions and provides a high temperature, high pressure gas separator of simplified construction having a single high strength housing sub-divided into overhead, inlet and underflow chambers by a pair of flanged and dished heads arranged crosswise of the housing. The head bulge, in concert with the internal curve radius connecting this bulge with the head flange, provides flexibility amply accommodating differential expansion between the large area stainless steel heads and the carbon steel housing. At least the rim if not the major portion of the wide head flanges of two species of the invention are in snug contact with the inner surface of the housing and in all species, the rim edges are welded to the housing whereby the greater expansion of the heads places the housing wall in hoop tension without subjecting the welds to shear stresses. A multiplicity of inertial separators are arranged in parallel between and secured to only one of these heads and each separator has a sliding gas-tight fit with the other head. All gas inlet and outlet nozzles are secured only to the housing sidewalls and have no connection with internal metal components thereby avoiding the need for internal expansion joints or other protective expedients. The interior walls of the housing are protected and insulated by thermal refractory material and those portions of any separators in the path of particulate laden gases are protected with abrasion resistant refractory material.

The principles of this invention are exemplified in three illustrative embodiments disclosed in detail herein below. The single housing of each embodiment includes a cylindrical mid-section, a downwardly converging bottom end wall and a hemispherical top wall. The flanged dished heads may bulge toward or away from one another and may be of the same or different diameters, the advantages and benefits of each arrangement being outlined in detail below.

Typically all three embodiments have a diameter of 18 to 36 feet, a height of 40 to 75 feet, and weigh 60 to 125 tons. Inlet and outlet ducts are typically 4 to 6 feet in diameter and handle as much as 250,000 cubic feet of gas per minute.

Accordingly, it is a primary object of this invention to provide a unique, minimum maintenance, rugged, highly reliable, structurally simplified gas separator of economic design for use under the high temperature, and high pressure conditions commonly encountered in petroleum cracking and coal pyrolysis industries.

Another object of the invention is the provision of an improved high temperature pressurized gas separator having an internally insulated metal housing of carbon steel material embracing internal heat and erosion resistant metal components which are free of connection to the gas inlet and outlet nozzles.

Another object of the invention is the provision of a unique gas separator adapted to function continuously to supply clean, high temperature, high pressure gas to gas expander power recovery apparatus at optimum efficiency.

Another object of the invention is the provision of a high temperature pressurized gas separator having a single housing devoid of any expansion joints.

Another object of the invention is the provision of an improved high temperature high pressure gas separator having an internally insulated carbon steel outer housing sub-divided into separate chambers by dished flanged heads of erosion resistant material and arranged to place the housing in hoop tension under operating conditions.

Another object of the invention is the provision of a high temperature pressurized gas separator divided into a plurality of chambers by heads having a cylindrical flange connected to the main body of the head by an internal curved radius portion.

Another object of the invention is the provision of a high temperature, high pressure gas separator so constructed and arranged as to process a maximum volume of dirty gas with maximum efficiency in a housing utilizing a minimum amount of material.

These and other more specific objects will appear upon reading the following specification and claims and upon considering in connection therewith the attached drawings to which they relate.

Referring now to the drawing in which a preferred embodiment of the invention is illustrated:

Figure 1:
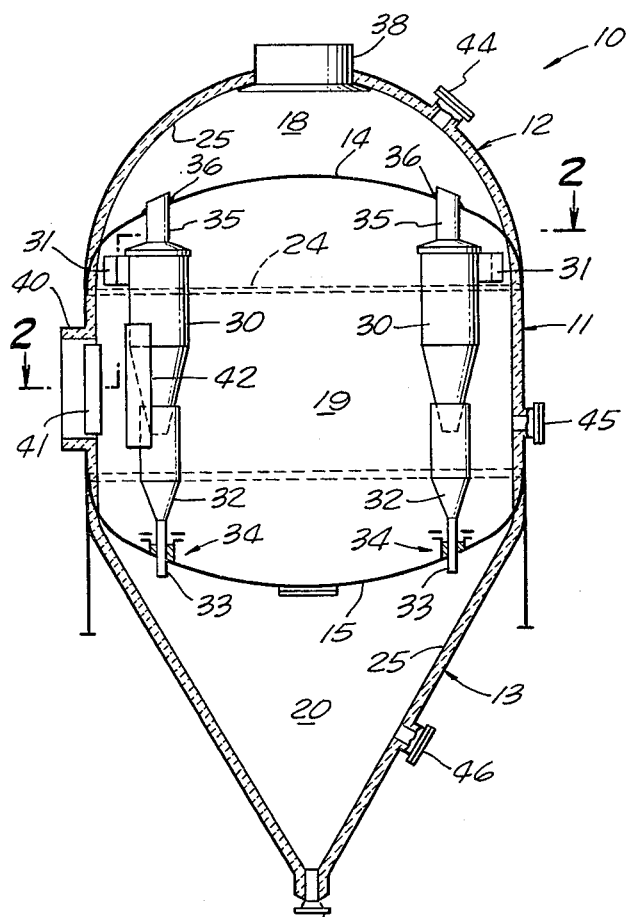
FIG. 1 is a vertical cross sectional view through an illustrative embodiment of the invention.

Referring initially more particularly to FIGS. 1 to 4, there is shown a first illustrative embodiment of the invention gas and particulate separator for use in a power recovery system, the separator being designated generally 10 and having an upright tubular housing formed of suitable high strength material such as carbon steel. As there shown the separator housing 11 comprises a cylindrical midsection, suitably secured to a hemispherical top 12 and a generally conical bottom 13 provided with a particle outlet nozzle 16. Extending crosswise of housing 11 are a pair of similar flanged and dished heads 14 and 15 formed of suitable heat resistant material, such as 304 stainless steel or the like material. These heads are generally eliptically shaped and subdivide the interior of the separator housing 11 into an overhead chamber 18, an inlet chamber 19 and an underflow chamber 20.

Figure 3:
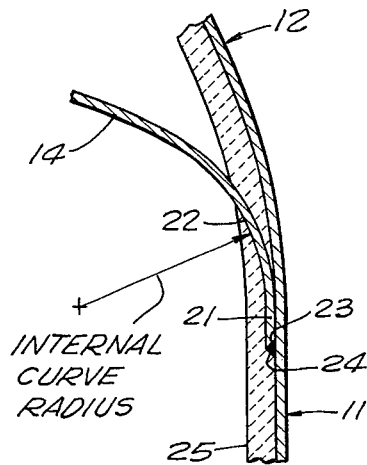
FIG. 3 is a fragmentary cross sectional view on an enlarged scale taken through one of the joints between the housing wall and the flanged and dished head.

Preferably heads 14 and 15 are substantially identical except for thickness and formed with relatively high substantially cylindrical flanges 21 fairing into the internal curve radius 22, as is best shown in FIG. 3, which in turn fairs into the dished portion proper of the head. This expedient avoids subjecting the structure generally and the inertial separators in particular to injurious torque and moment stresses. The relatively high magnitude expansion occuring in the stainless steel heads 14 and 15 owing to the prevailing operating temperatures is resisted by the sidewalls of housing 11 causing this wall to be placed in hoop tension and placing each of the heads in compression thereby causing each to bulge axially. This increased bulging takes place without interference from the inertial separators 30 owing to the resilient packing of the stuffing boxes mounted between lower head 15 and the separators 30 as will be described in greater detail presently. The exterior surface of flange 22 is sized to have a snug fit with the interior surface of the separator housing 11. The rim edge of flange 22 is chamfered as indicated at 23 and is secured to the housing wall by weld 24. After the heads have been installed all interior surfaces of housing 11 are lined with thermal refractory material 25 to minimize loss of process heat. This material covers the flanges 22 of heads 14 as well as welds 24, thereby partially isolating these components from the high temperatures typically prevailing interiorly of housing 11.

Figure 4:
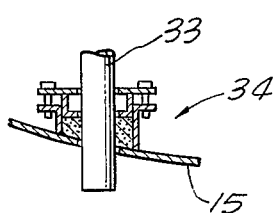
FIG. 4 is a fragmentary cross sectional view on an enlarged side taken through one of the stuffing boxes at the lower end of each inertial separator.
Figure 2:
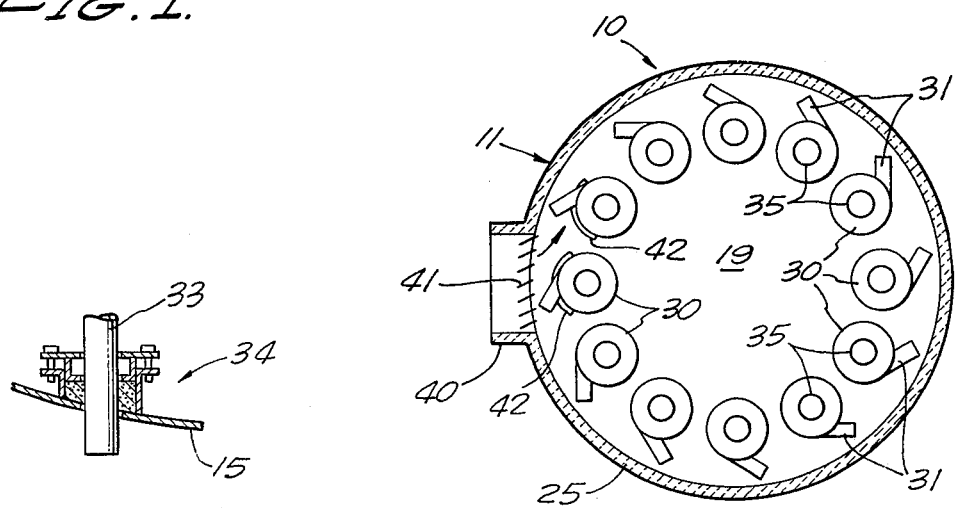
FIG. 2 is a cross sectional view taken generally along the broken line 2—2 on FIG. 1.

Arranged in one or more circles within inlet chamber 19 are a multiplicity of similar inertial separators 30 of well known construction having particulate-laden tangential gas inlets 31 at their upper ends. The smaller diameter lower end 32 of each is provided with an underflow or dip tube 33 through which separated particulate discharges into the underflow chamber 20. These underflow tubes extend through gas-tight stuffing boxes 34 carried by the dished head 15 typically constructed as shown in FIG. 4. These stuffing boxes are packed with Kaowool or the like resilient refractory sealing material. These stuffing boxes cooperate with the dished heads 14 and 15 to maintain the inertial separators in axial parallelism and leave the two heads free to flex, contract and bulge without imposed stress and strain on any of the internal components under normal high temperature conditions and particularly during "after burn" conditions.

The upper end of each separator includes an upwardly directed clean gas discharge tube 35 opening through upper head 14 and suitably secured thereto as by welds 36. The clean gas escaping into the overhead chamber 18 through tubes 35 is conveyed away from separator 10 through the outlet nozzle 38.

Dirty or particulate laden gas enters inlet chamber 19 through an inlet nozzle 40 provided with turning vanes 41 and opening into this chamber through the sidewall of housing 11. Preferably the sidewall of separators 30 located opposite or closely adjacent the discharge end of inlet nozzle 40 are provided with a protective shield 42. These shields may be formed of heat resistant hexagon mesh covered with abrasion resistant refractory material and are welded or otherwise secured about those portions of separators 30 in the direct path of the high velocity gas entering inlet chamber 19 from nozzle 40. The internal surfaces of separators 30 are likewise provided with similar hexagon mesh and abrasion resistant refractory shields.

Housing 11 and each of its three chambers 18, 19 and 20 is provided with one or more manhole facilities 44, 45 and 46.

In operation and when the separator 10 is used in a typical petroleum refining operation to separate catalyst particulate from hot gases, the particulate-laden gas stream enters inlet chamber 19 through nozzle 40 at a temperature of 1,200 to 1,300 degrees F. and at a pressure up to 30 to 40 psig. This material then flows without the use of connecting ducts directly to the inlets 31 of each of the separators 30, without the use of connecting ducts, where the fine material is separated in known manner by centrifugal action and discharges downwardly through underflow tubes 33 into the underflow collection chamber 20. Usually this material is withdrawn continuously through nozzle 16 in accordance with well known practice and the clean gas escapes through outlet tubes 35 into overhead chamber 18 and through outlet nozzle 38 to a power recovery gas expander, not shown, or to a suitable utilization facility forming no part of this invention.

The entire separator facility operates at high temperature and all components expand. Since the inertial separators 30 are here shown as suspended from the upper head 14, the differential longitudinal expansion occurring between the outer shell, or housing 11 the two heads and separators 30 is readily accommodated by axial sliding movement between underflow tubes 33 and the sealing material in packing boxes 34. Expansion occurring in either head is accommodated, in part, by axial bulging of each head and, in part, by the radial forces thereby created which are constrained and transmitted by the internal curve radius 22 to flanges 21 and thence to the cylindrical sidewall 11 thereby placing the juxtaposed portions of housing wall 11 under hoop tension without, however, subjecting welds 24 to rupture or destructive stresses. For these reasons, it will be apparent that welds 24 are not subjected to shear stress of other than negligible magnitude.

In view of the foregoing, it will be recognized that no welds anywhere in the invention separator 10 are subjected to any except relatively low level readily accommodated stresses. Moreover, welded joints which might be subjected to higher than normal stresses under abnormal operating conditions are protected against sudden temperature rises by the thick lining of heat insulating refractory material 25.

Figure 5:
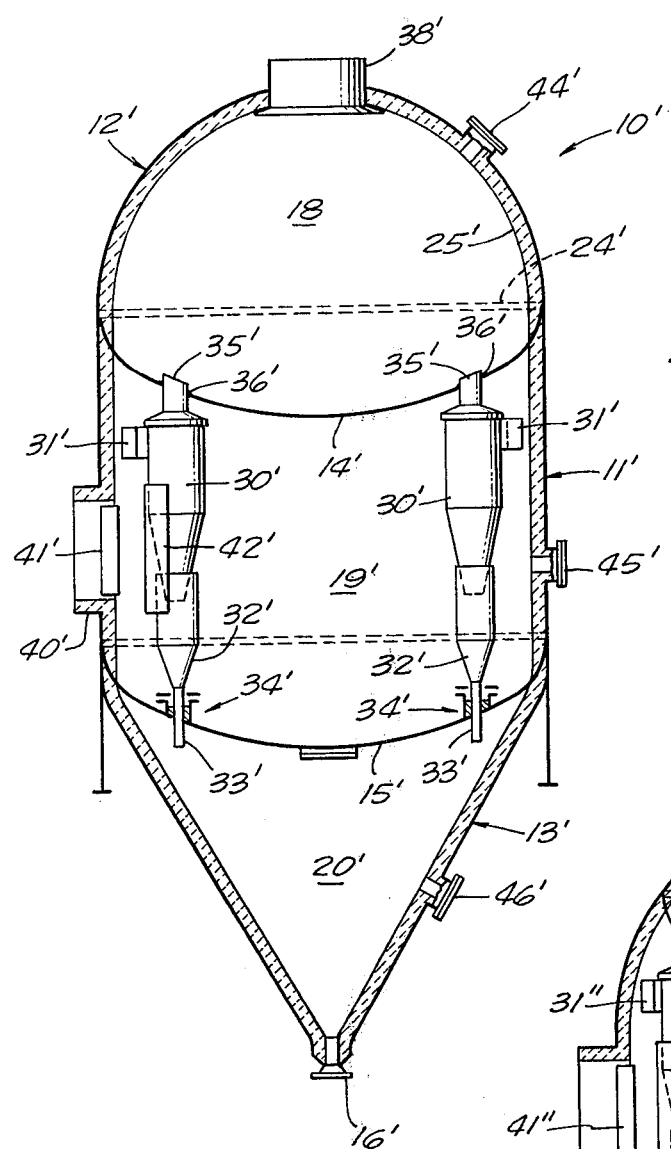
FIG. 5 is a vertical cross sectional view through a second illustrative embodiment.
Figure 6:
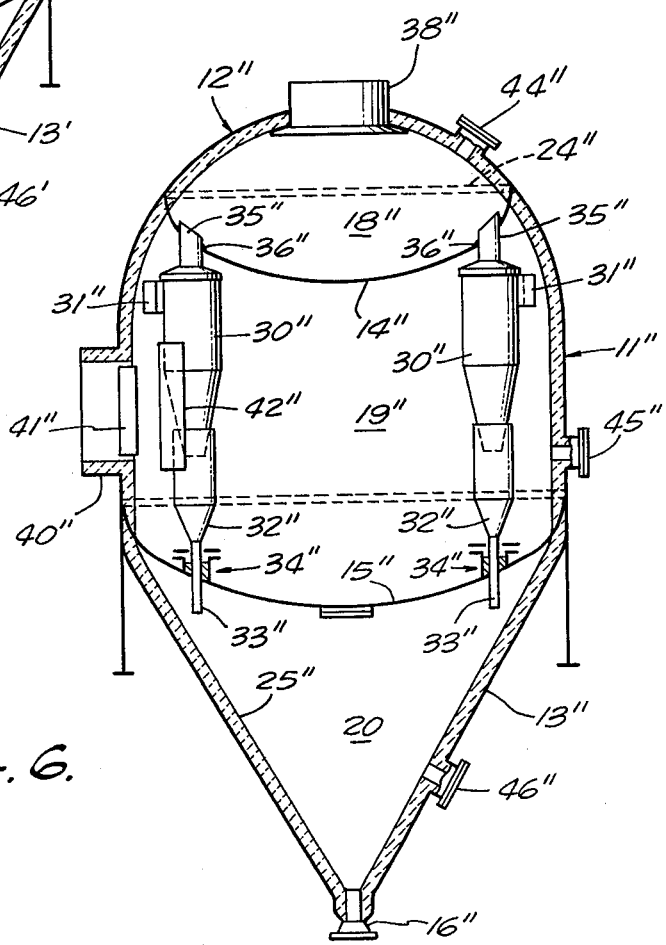
FIG. 6 is a vertical cross sectional view through a third illustrative embodiment of the invention.

Referring next to FIGS. 5 and 6 there are shown two other illustrative embodiments of the invention hot gas separator designated 10' and 10" wherein the same or related components are designated by the same reference characters as in the FIGS. 1 to 4 embodiment but are respectively distinguished therefrom by the addition of a prime and a double prime.

As will be evident from a cursory inspection of FIGS. 1, 5 and 6, the three embodiments represented by these figures differ from one another essentially in the arrangement of the upper and lower dished heads relative to one another and to the inlet section 19 of each embodiment. In FIG. 1, the upper head 14 is placed under compression by the load imposed thereon by separators 30, 30 whereas in each of the FIGS. 5 and 6 embodiments each of the upper heads 14' and 14" are arched downwardly with the result that these heads are placed in tension by the weight of separators 30', 30". The upper heads 14' and 14" can therefore be made of thinner material and utilize the tension stresses advantageously to counteract stresses which otherwise could cause distortion and warpage. The tension forces acting in the heads also tend to minimize the hoop tension forces imposed on the outer housing by the higher magnitude of expansion taking place in the stainless steel heads than in the carbon steel housings 11' and 11".

It will also be observed that the cylindrical housing 11' embracing the gas inlet chamber 19' in FIG. 5 is appreciably longer than the corresponding cylindrical housing 11 in FIG. 1 by a factor of roughly 70%. In FIG. 6, however, the cylindrical portion 11" of inlet chamber 19" is shorter than the cylindrical portion 11 of FIG. 1 by approximately 12% since chamber 19" is formed in part by the lower portion of the hemispherical top wall 12".

The two embodiments shown in FIGS. 5 and 6 differ from one another in no wise functionally but do differ structurally and in the economic use of materials. In both FIGS. 5 and 6 the upper heads 14', 14" bulge downwardly and in the same direction as the lower head. In FIG. 5, upper head 14' is welded to the upper end of the cylindrical shell 11' of inlet chamber 19' and the inertial separators 30' are suspended therefrom with the result that their weight places the head in tension. This enables the designer to employ a head of substantially thinner stainless steel material than in FIG. 1 where the weight of the separators 30 places that head under compression. A dished head in tension is less susceptible to buckling and warpage stresses than is the case when the head is in compression.

The FIG. 6 embodiment employs a downwardly dished head 14" its upper edge being welded to the interior of the hemispherical top 12" in a horizontal plane intermediate to the connection of the top 12" with the cylindrical shell 11" and the clean gas nozzle 38". Heat 14" is substantially smaller in size which subjects it to lower magnitude stresses rendering it less sensitive to buckling and warpage stresses. As a result and because of the fact that it is also in tension it can be made still thinner than head 14'.

Since both the upper and lower heads in all embodiments are preferably and typically of stainless steel welded to the interior of the outer separator housing typically of carbon steel, the very substantially higher expansion of the heads in all three embodiments acts in each instance to place the outer housing in hoop tension. In all instances, however, it will be noted that a substantial area of the bimetal connection between the rim of the heads and the sidewalls of the separator housing is enclosed in the insulating lining material 25, 25', 25''. The heat insulation thereby provided minimizes the stresses and strains imposed on the welded joints and greatly minimizes the likelihood of failure by rupture.

It will therefore be recognized that each of the illustrative embodiments of the invention herein disclosed provide an unusually simple, highly-efficient separator capable of operating continuously under high-temperature, high-pressure conditions.

While the particular fluid dynamic separator herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A high temperature high pressure gas separator suitable for use under load at pressures of 30 to 40 psig normally at temperatures of 1200° to 1300° F. and transient temperatures of up to 2600° F. and adapted to supply hot, clean pressurized gas to a gas expander of power recovery equipment comprising:
   an upright carbon steel housing lined interiorly thereof with refractory material;
   a plurality of spaced-apart flanged and dished heads of heat resistant metal extending crosswise of said housing thereby dividing the same into an inlet chamber located between an overhead chamber and an underlying underflow chamber, the inner surfaces of said flanges being covered with said refractory material and the peripheral edge of said flanges being welded to the sidewall of said housing in annular areas spaced inwardly from the opposite ends of said housing whereby substantially greater temperature rises in said heads than in said housing will cause said heads to bulge and to place the adjacent sidewall portions of said housing in hoop tension and whereby the thermal expansion of said heads will occur symmetrically and uniformly across the full area thereof thereby avoiding warpage and buckling due to thermal expansion stresses;
   a plurality of inertial type gas and particulate separator means in said inlet chamber having their opposite ends opening through a respective one of said heads, and each of said opposite ends discharging solely into a respective one of said overhead and underflow chambers through a valveless unrestricted coaxial outlet;
   particulate-laden gas inlet means free of connection to either of said dished heads and opening into said inlet chamber through the sidewall of said housing in an area between said dished heads; and
   clean gas outlet means for said overhead chamber.

2. A separator as defined in claim 1 characterized in that one end only of said separator means is supported by the adjacent one of said dished heads, and the other end of said separator means having a telescopic fit through the other of said dished heads.

3. A separator as defined in claim 1 characterized in that the discharge of said gas inlet means terminates closely adjacent the interior of said gas inlet chamber.

4. A separator as defined in claim 1 characterized in that each of said heads is provided with an internal curve radius, the interior surface of said housing sidewall being in abutting contact with the adjacent surfaces of said head flanges whereby expansion of said heads, when heated, places said flanges in hoop compression via said internal curve radius of said heads and places the juxtaposed portion of said housing sidewall in hoop tension, and said hoop compression and hoop tension cooperating with said internal curve radius to cause said heads to bulge symmetrically without destructive deformation.

5. A separator as defined in claim 1 characterized in that each of said inlet and outlet means terminate substantially adjacent the interior surfaces of said housing.

6. A separator as defined in claim 1 characterized in that said dished heads bulge away from one another and toward a respective end of said housing.

7. A separator as defined in claim 1 characterized in that said dished heads bulge in the same direction toward one end of said housing.

8. A separator as defined in claim 1 characterized in that the upper one of said dished heads bulges downwardly and is welded to the upper ends of said inertial separator means whereby the weight of said separator means acts to place said upper head in tension.

9. A separator as defined in claim 1 characterized in that said housing includes a cylindrical mid-section embracing said inlet chamber and a hemispherical end wall embracing said overhead chamber, and the adjacent one of said dished heads being welded to said housing adjacent the merger of said hemispherical end wall with the upper edge of said cylindrical midsection.

10. A separator as defined in claim 1 characterized in that said inlet chamber has a cylindrical sidewall merging at the opposite ends thereof with the adjacent edges of the converging walls of a respective one of said overhead and underflow chambers, and the axial length of said cylindrical sidewall being substantially less than the axial length of said inertial type separator means.

11. A separator as defined in claim 1 characterized in that said dished heads are formed of stainless steel.

12. A separator as defined in claim 1 characterized in that said gas inlet nozzle is provided with turning vane means positioned to direct the gas flow toward the separator inlets.

13. A separator as defined in claim 1 characterized in that said inertial separator means are secured to and suspended from the flanged and dished head separating said overhead and inlet chambers from one another.

14. A separator as defined in claim 13 characterized in the provision of substantially gas tight stuffing box means between the other one of said dished heads and the adjacent end of each of said inertial separators.

15. A separator as defined in claim 1 characterized in that the end wall of said housing provided with said overhead chamber is hemispherical, and the adjacent one of said dished heads being smaller in diameter than said hemispherical end wall and the flanged edge of said head being welded directly thereto in a circle of generally the same diameter as said last mentioned head.

16. A separator as defined in claim 15 characterized in that the sidewall of said inlet chamber is formed in part by the larger diameter portion of said hemispherical end wall and, in part by a cylindrical wall whereby the axial length of the cylindrical portion of said inlet chamber is substantially less than the axial length of said inertial separator means.

17. A separator as defined in claim 1 characterized in that said inlet and outlet means are located substantially entirely outside said inlet, overhead and underflow chambers and are in direct flow communication with respective ones thereof independently of expansion joint means.

18. A separator as defined in claim 17 characterized in the provision of gas stream deflector means of abrasion resistant refractory means supported in said gas inlet chamber crosswise of and spaced forwardly of the outlet end of said gas inlet means to protect said separator means from erosion by particulate carried by the gas stream.

19. A separator as defined in claim 18 characterized in that said gas deflector means is supported along one side of gas and particulate separator means closest to the discharge end of said gas inlet means.

20. A high temperature high pressure gas separator suitable for use at pressures in excess of 30 psig and temperatures in excess of 1000° F. and temporarily as high as 2600° F. comprising:
 an upright tubular metal housing lined with refractory material and having a cylindrical mid-section closed at its top by a hemispherical end wall and closed at its bottom by a downwardly converging end wall;
 a pair of spaced-apart flanged and dished heads of heat resistant metal provided with an internal radius forming partitions extending crosswise of said housing with their peripheral edges welded to the interior sidewall of said housing and dividing the same into inlet, overhead and underflow chambers, and the inwardly facing surfaces of said flanges being covered with said refractory material;
 a plurality of inertial type gas and particulate separators located in said inlet chamber with the opposite ends thereof opening through a respective one of said pair of dished heads, said separators being supported at one end by one of said heads and the remote other end of each having a single unrestricted outlet for particulate having a sliding fit with a respective substantially gas tight stuffing box means extending through the other of said heads; and
 separate nozzle means mounted on and opening through the wall of said housing directly into communication with a respective one of said inlet, overhead and underflow chambers and free of connection to either of said dished heads.

21. A separator as defined in claim 20 characterized in that said flanged and dished heads are provided with an annular internal curved radius portion interconnecting the flanged rim and the dished portion thereof and effective to distribute thermal expansion growth symmetrically and uniformly thereby isolating said heads from destructive deformation or warpage.

22. A separator as defined in claim 20 characterized in that said dished heads are subjected to relatively high gas temperatures and to relatively high magnitude expansion, whereby said heads, when heated, expand radially thereby pressing the outer surfaces thereof against the juxtaposed surfaces of the housing sidewall and placing the same in hoop tension without subjecting said welding to rupture stresses and whereby the thermal expansion of said heads will occur symmetrically and uniformly across the full area thereof thereby avoiding warpage, buckling and destructive deformation of said heads.

23. A separator as defined in claim 22 characterized in that said dished heads bulge away from one another and toward the opposite ends of said housing.

24. A separator as defined in claim 20 characterized in that said housing is made of carbon steel and said dished heads are made of stainless steel.

25. A separator as defined in claim 24 characterized in that the upper one of said dished heads is of substantially smaller diameter than the diameter of said hemispherical end wall with its peripheral edge welded to the interior of said end wall along a surface of contact therewith of similar diameter as the diameter of said dished head.

* * * * *